United States Patent
Ohta et al.

(10) Patent No.: US 11,820,331 B2
(45) Date of Patent: Nov. 21, 2023

(54) FINGERPRINT AUTHENTICATION DEVICE

(71) Applicants: TOYOTA JIDOSHA KABUSHIKI KAISHA, Toyota (JP); KABUSHIKI KAISHA TOKAI RIKA DENKI SEISAKUSHO, Aichi (JP)

(72) Inventors: Yasuhisa Ohta, Toyota (JP); Yuya Goto, Toyota (JP); Naoyuki Takada, Toyota (JP); Takahiko Ando, Niwa-gun (JP); Yosuke Ohashi, Niwa-gun (JP); Rijin Owaki, Niwa-gun (JP); Daisuke Ogawa, Niwa-gun (JP)

(73) Assignees: TOYOTA JIDOSHA KABUSHIKI KAISHA, Toyota (JP); KABUSHIKI KAISHA TOKAI RIKA DENKI SEISAKUSHO, Niwa-gun (JP)

( * ) Notice: Subject to any disclaimer, the term of this patent is extended or adjusted under 35 U.S.C. 154(b) by 0 days.

(21) Appl. No.: 17/982,607

(22) Filed: Nov. 8, 2022

(65) Prior Publication Data

US 2023/0067036 A1    Mar. 2, 2023

Related U.S. Application Data

(63) Continuation of application No. 17/541,850, filed on Dec. 3, 2021, now Pat. No. 11,524,657, which is a
(Continued)

(30) Foreign Application Priority Data

Oct. 12, 2018    (JP) ................. 2018-193672

(51) Int. Cl.
*B60R 25/25*    (2013.01)
*B60R 25/32*    (2013.01)
*G06V 40/12*    (2022.01)

(52) U.S. Cl.
CPC ............ *B60R 25/252* (2013.01); *B60R 25/32* (2013.01); *G06V 40/1365* (2022.01)

(58) Field of Classification Search
CPC .... G06V 40/12; G06V 40/1365; G06V 40/10; G06V 10/141; G06V 40/1318;
(Continued)

(56) References Cited

U.S. PATENT DOCUMENTS 6,100,811 A    8/2000  Hsu et al.
10,246,055 B2 *  4/2019  Farges ................... H04W 4/40
(Continued)

FOREIGN PATENT DOCUMENTS

JP    2003-034235 A    2/2003
JP    2003-256818 A    9/2003
(Continued)

OTHER PUBLICATIONS

Sep. 15, 2020 Office Action issued in U.S. Appl. No. 16/512,842.
(Continued)

*Primary Examiner* — Koosha Sharifi-Tafreshi
(74) *Attorney, Agent, or Firm* — Oliff PLC

(57) ABSTRACT

A system is mounted on a vehicle and includes a sensor configured to perform a detection process that detects a fingerprint of a finger touching the sensor in order to perform a fingerprint authentication process, and a controller. The controller is configured to: (i) control a power supply of the vehicle to be ON when a predetermined authentication process through a predetermined communication with another device other than the sensor is successful, the predetermined authentication process being different from the fingerprint authentication process, and (ii) suppress the detection process that detects the fingerprint in response to the power supply of the vehicle being ON and the predetermined authentication process being successful.

20 Claims, 2 Drawing Sheets

Related U.S. Application Data continuation of application No. 17/200,354, filed on Mar. 12, 2021, now Pat. No. 11,230,263, which is a continuation of application No. 16/512,842, filed on Jul. 16, 2019, now Pat. No. 10,974,697.

(58) Field of Classification Search
CPC .... G06V 40/1376; G06V 40/14; G06V 40/70; B60R 25/252; B60R 25/32
See application file for complete search history.

(56) References Cited

U.S. PATENT DOCUMENTS

2018/0361993 A1* 12/2018 Carroll .................... B60R 25/02
2020/0062218 A1    2/2020 Lee et al.

FOREIGN PATENT DOCUMENTS

| JP | 2008-056035 A | 3/2008 |
| JP | 2008-174095 A | 7/2008 |
| JP | 2010-047052 A | 3/2010 |
| JP | 2017-537416 A | 12/2017 |
| WO | 2016/065482 A1 | 5/2016 |

OTHER PUBLICATIONS

Dec. 16, 2020 Notice of Allowance issued in U.S. Appl. No. 16/512,842.
Oct. 5, 2021 Notice of Allowance issued in U.S. Appl. No. 17/200,354.
Aug. 23, 2022 Notice of Allowance issued in U.S. Appl. No. 17/541,850.

* cited by examiner

FINGERPRINT AUTHENTICATION DEVICE

INCORPORATION BY REFERENCE

This is a Continuation of U.S. patent application Ser. No. 17/541,850 filed Dec. 3, 2021, which in turn is a Continuation of U.S. patent application Ser. No. 17/200,354 filed Mar. 12, 2021 (now U.S. Pat. No. 11,230,263), which is a Continuation of U.S. patent application Ser. No. 16/512,842 filed Jul. 16, 2019 (now U.S. Pat. No. 10,974,697), which claims the benefit of Japanese Patent Application No. 2018-193672 filed in Japan on Oct. 12, 2018. The disclosure of each of the prior applications is hereby incorporated by reference herein in its entirety.

BACKGROUND

1. Technical Field

The present disclosure relates to a fingerprint authentication device mounted in a vehicle.

2. Description of Related Art

A device using fingerprint authentication in which authentication is performed using a fingerprint of a user has been proposed. Japanese Unexamined Patent Application Publication No. 2003-034235 (JP 2003-034235 A) discloses a vehicle including an authentication device that switches between a mode in which authentication of a fingerprint of a user of a vehicle is needed and a mode in which use of the vehicle is permitted with solely an ignition key. Japanese Unexamined Patent Application Publication (Translation of PCT Application) No. 2017-537416 (JP 2017-537416 A) discloses an electronic device that includes a force sensor that detects a gripping force, in which a fingerprint sensor is activated when a user grips the electronic device.

SUMMARY

A fingerprint sensor used in a fingerprint authentication device performs a fingerprint detection process for detecting a fingerprint when a finger is brought into contact with a fingerprint reading portion. Examples of a scheme of such a fingerprint detection process include a capacitive type and an electric field intensity type, but there is a possibility of generation of radio wave noise from a fingerprint sensor at the time of execution of the fingerprint detection process. When a fingerprint authentication device is mounted in a vehicle and a user carelessly touches a fingerprint sensor, a fingerprint detection process is executed even when the fingerprint detection process is not needed, and there is a possibility of degradation of in-vehicle comfort such as degradation of sound quality due to noise generated in sound of a radio under an influence of radio wave noise.

The present disclosure provides a fingerprint authentication device in which a possibility of in-vehicle comfort being affected when a fingerprint sensor is carelessly touched has been suppressed.

An aspect of the present disclosure relates to a fingerprint authentication device mounted in a vehicle. The fingerprint authentication device includes a fingerprint sensor configured to perform a fingerprint detection process for detecting a fingerprint of a finger brought into contact with the fingerprint sensor; a fingerprint authentication unit configured to perform a fingerprint authentication process based on the fingerprint detected through the fingerprint detection process; and a controller configured to control permission and non-permission of execution of the fingerprint detection process. The controller is configured not to permit the execution of the fingerprint detection process when a speed of the vehicle is equal to or greater than a predetermined value.

In the fingerprint authentication device according to the aspect, the controller may be configured not to permit the execution of the fingerprint detection process when the controller detects a state in which a predetermined first condition has been satisfied, which is assumed to be a state in which the fingerprint detection process is not needed, even in a case in which the speed of the vehicle is smaller than the predetermined value.

In the fingerprint authentication device according to the aspect, the first condition may be a condition that at least one of a second condition and a third condition is satisfied. The second condition may be a condition that a power supply of the vehicle is ON, the fingerprint authentication process is successful, and the fingerprint sensor is a genuine product, and the third condition may be a condition that the power supply of the vehicle is ON, and a predetermined authentication process that is an alternative to the fingerprint authentication process is successful.

In the fingerprint authentication device according to the aspect, the controller may be configured to determine whether or not the fingerprint sensor is a genuine product by performing predetermined communication with the fingerprint sensor to authenticate the fingerprint sensor.

In the fingerprint authentication device according to the aspect, the controller may be configured to permit the execution of the fingerprint detection process when the speed of the vehicle is smaller than the predetermined value and the controller detects a state in which a predetermined fourth condition has been satisfied, which is assumed to be a state in which the fingerprint detection process is needed, in a case in which the execution of the fingerprint detection process is not permitted.

In the fingerprint authentication device according to the aspect, the fourth condition may be a condition that at least one of a brake being in operation, a door of a driver's seat having changed from a closed state to an open state, the door of the driver's seat having changed from the open state to the closed state, a push start switch having changed from an OFF state to an ON state, a fingerprint authentication request having been received from another device, and a power supply of the vehicle having changed from a state other than an OFF state to the OFF state is satisfied.

According to the aspect of the present disclosure, it is possible to provide a fingerprint authentication device in which a possibility of in-vehicle comfort being affected when a fingerprint sensor is carelessly touched has been suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment

In a fingerprint authentication device according to an embodiment of the present disclosure, a fingerprint detection process in a fingerprint sensor is suppressed under a situation in which it is assumed that the fingerprint detection process for fingerprint authentication is not requested. Accordingly, even when the user carelessly touches a fingerprint reading portion of the fingerprint sensor, the fingerprint sensor does not execute the fingerprint detection process. Therefore, radio wave noise is not generated and it is possible to suppress a possibility of degradation of in-vehicle comfort such as degradation of sound quality of a radio. Hereinafter, the embodiment will be described in detail with reference to the drawings.

Configuration

Figure 1:
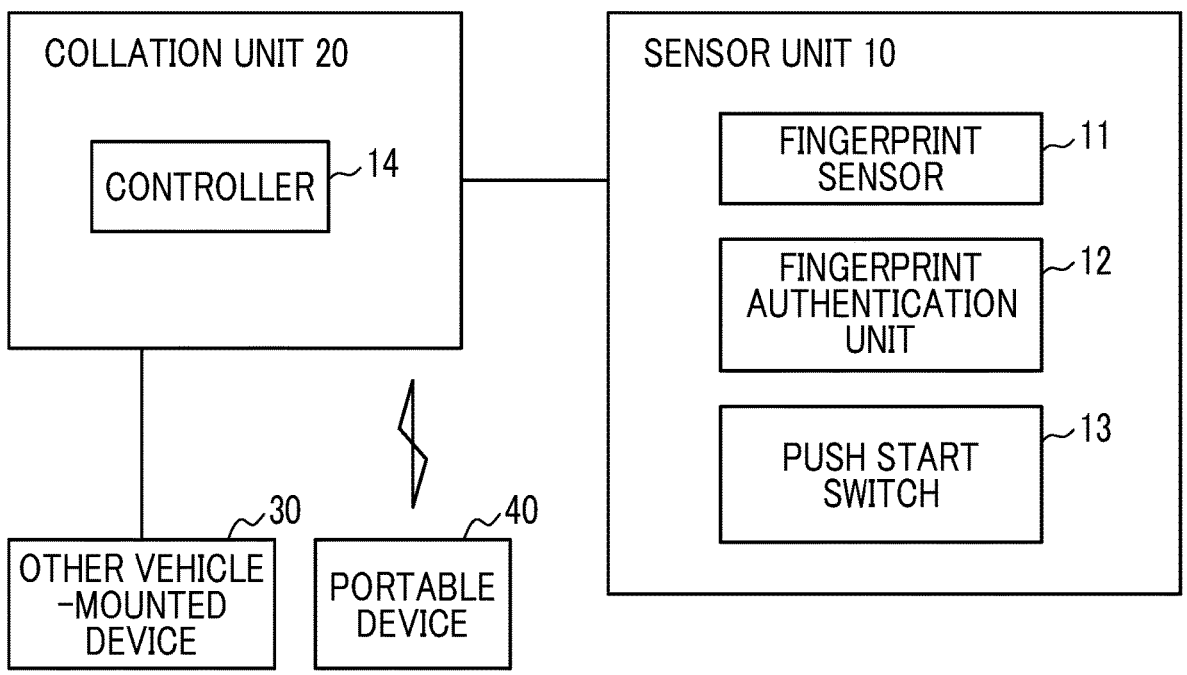
FIG. 1 is a diagram illustrating a functional block of a fingerprint authentication device according to an embodiment of the present disclosure.

FIG. 1 illustrates a functional block diagram of a fingerprint authentication device 1 according to the embodiment. The fingerprint authentication device 1 is mounted in a vehicle and includes a fingerprint sensor 11, a fingerprint authentication unit 12, and a controller 14. In an example illustrated in FIG. 1, the fingerprint sensor 11 is integrally formed with a push start switch 13, and constitutes a sensor unit 10 with the fingerprint authentication unit 12. Further, the controller 14 constitutes a collation unit 20 to be described below as an example.

The fingerprint sensor 11 performs a fingerprint detection process of capturing and detecting an uneven pattern of a finger as a fingerprint when the finger is brought into contact with the fingerprint reading portion. A specific scheme of the fingerprint detection process is not limited. The fingerprint authentication unit 12 performs a fingerprint authentication process of a user based on the fingerprint detected by the fingerprint detection process of the fingerprint sensor 11. A fingerprint authentication method in the fingerprint authentication unit 12 is not limited, and for example, one or more fingerprints are registered in association with identifiers in advance, a detected fingerprint is collated with the registered fingerprints, a degree of matching is calculated using a predetermined method, and the fingerprint authentication is successful when the degree of matching is equal to or higher than a predetermined degree. The sensor unit 10 notifies the collation unit 20 of a fingerprint authentication result.

The push start switch 13 is a switch that detects that the switch has been pressed and switches an internal state between ON and OFF. The fingerprint reading portion of the fingerprint sensor 11 is provided on a surface of the push start switch 13. That is, for example, when the push start switch 13 is pressed by a finger, the fingerprint sensor 11 can execute the fingerprint detection process.

The collation unit 20 controls an authentication process using wireless communication with a portable device 40 such as a smart key, and a fingerprint authentication process using the sensor unit 10. Through this authentication process, it is possible to collate acquired information of the user with information of a user having a right of an authorized vehicle manipulation registered in advance. The collation unit 20 decides whether or not the user can manipulate the vehicle, and an operation of the vehicle according to a result of the collation. The collation unit 20 can communicate with one or more other vehicle-mounted devices 30 to appropriately acquire various states of the vehicle or perform a notification of processing results, if needed for such processes. Further, such processes may be all performed by the controller 14, or the collation unit 20 may include another controller (not illustrated) different from the controller 14, the controller 14 may perform some of the processes including control of the sensor unit 10, and the other controller may perform remaining processes such as communication with the portable device 40 or the other vehicle-mounted device 30.

Process

In the embodiment, the fingerprint authentication is typically executed in order to determine whether or not transition to an ignition ON (ready ON) state is permitted. The fingerprint authentication is also executed when, for example, another vehicle-mounted device such as a navigation device has requested authentication of the user.

Therefore, in the embodiment, the controller 14 of the collation unit 20 controls the fingerprint sensor 11 based on, for example, a state of the vehicle acquired by the collation unit 20 to set a state in which the fingerprint detection process is permitted in a state in which a possibility of fingerprint authentication being requested is high and to set a state in which the fingerprint detection process is not permitted in a state in which the fingerprint authentication is not requested. In a state in which the fingerprint detection process is permitted, when the finger is brought into contact with the fingerprint reading portion, the fingerprint sensor 11 executes the above-described fingerprint detection process. In the state in which the fingerprint detection process is not permitted, the fingerprint sensor 11 does not execute the above-described fingerprint detection process even when the finger is brought into contact with the fingerprint reading portion. A method of realizing the state in which the fingerprint detection process is not permitted is not limited, as long as the execution of the fingerprint detection process of the fingerprint sensor 11 that generates radio wave noise in the sensor unit 10 can be suppressed. For example, supply of power to the fingerprint sensor 11 may be limited. Operations of units other than the fingerprint sensor 11, such as the fingerprint authentication unit 12, may not be particularly limited in the state in which the fingerprint detection process is not permitted.

Figure 2:
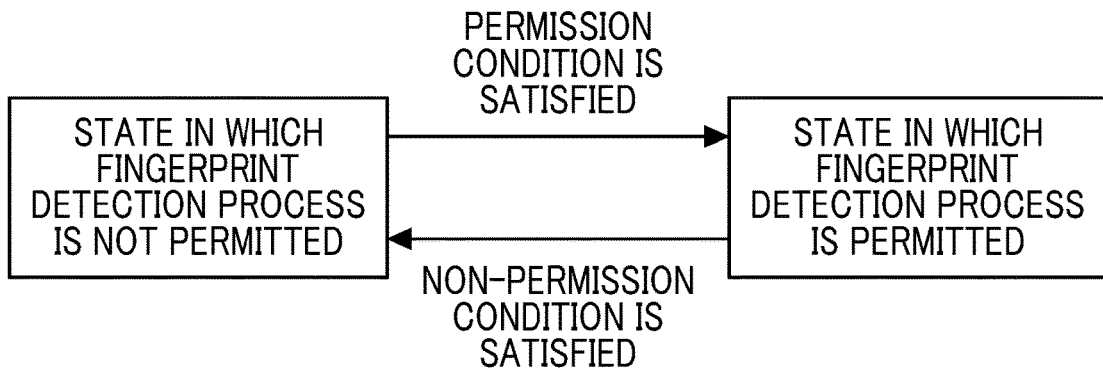
FIG. 2 is a diagram illustrating state transition of a fingerprint sensor according to the embodiment of the present disclosure.

A state transition diagram of the fingerprint sensor 11 is illustrated in FIG. 2. In an initial state, the fingerprint sensor 11 is in the state in which the fingerprint detection process is not permitted. When a predetermined permission condition is satisfied in the state in which the fingerprint detection process is not permitted, the state transitions to the state in which the fingerprint detection process is permitted. Further, when a predetermined non-permission condition is satisfied in the state in which the fingerprint detection process is permitted, the state transitions to the state in which the fingerprint detection process is not permitted.

Hereinafter, an example of the permission condition and the non-permission condition will be described.

First, the permission condition is a condition indicating a state of the vehicle in which it is assumed that the fingerprint detection process is needed for fingerprint authentication. In the embodiment, for example, the permission condition is as follows. That is, the permission condition is that the following (1) is satisfied and at least one of (2) to (7) is satisfied.

(1) The speed of the vehicle is smaller than a predetermined value (for example, less than 5 km/h).

(2) The brake is in operation.

(3) A door of a driver's seat has changed from a closed state to an open state.

(4) The door of the driver's seat has changed from the open state to the closed state.

(5) The push start switch has changed from an OFF state to an ON state.

(6) A fingerprint authentication request has been received from another vehicle-mounted device.

(7) A power supply of the vehicle has changed from a state other than an OFF state to the OFF state.

In the embodiment, the fingerprint authentication is typically executed in order to determine whether transition to the ignition ON (ready ON) state is to be permitted while the vehicle is being stopped. Further, performing the fingerprint authentication while the vehicle is traveling is suppressed for improved safety. Therefore, it is possible to suppress the fingerprint detection process in the fingerprint sensor 11 when the permission condition is that the vehicle is stopped. In practice, the permission condition may be that the speed of the vehicle is smaller than a predetermined value, which is very small, such as 5 km/h in consideration of an error of a detection speed of the vehicle, as in the above (1). Further, when the permission conditions are limited by the content of (2) to (7), it is possible to limit the permission conditions in a case in which it can be assumed with higher certainty that the fingerprint detection process is needed and to suppress the fingerprint detection process in the fingerprint sensor 11 more desirably.

In the embodiment, a manipulation specification is assumed in which, for transition to the ignition ON (ready ON) state, for example, a parking brake is operated, a shift position is set to parking, the push start switch 13 is pressed so that the push start switch 13 enters an ON state in a predetermined vehicle state such as a state in which a brake pedal is depressed, and successful fingerprint authentication is needed. Therefore, the permission condition can be limited by, for example, the brake being in operation, as in above (2), under a situation in which the above (1) is satisfied.

Alternatively, when the user gets on the driver's seat or the user sitting on the driver's seat is changed, a possibility of the transition to the ignition ON (ready ON) state is high. Therefore, the permission condition can be limited by a situation in which a possibility of occurrence of the user getting on the driver's seat or the change of the user sitting on the driver's seat is high, as in the above (3) or (4), under a situation in which the above (1) is satisfied.

Alternatively, the permission condition is limited by change of the push start switch 13 from the OFF state to the ON state due to the user actually pressing the push start switch 13, for example, for transition to the ignition ON (ready ON) state, as in the above (5), under a situation in which the above (1) is satisfied.

Alternatively, it is assumed that the user receives a charging service through communication with a server outside the vehicle via the other vehicle-mounted device 30 such as a navigation device while the vehicle is being stopped. It is conceivable to use the fingerprint authentication device 1 for user authentication requested in such a service or the like. Therefore, the permission condition can be limited by reception of the fingerprint authentication request from the other vehicle-mounted device 30, as in the above (6), under a situation in which the above (1) is satisfied.

Alternatively, there is a possibility of the user performing a manipulation of pressing the push start switch 13 to cause the power supply to transition from, for example, a state other than the OFF state (ignition ON (ready ON) or ACC (accessory) ON) to the OFF state, and then, pressing the push start switch 13 again to perform transition to the ignition ON (ready ON) state. Therefore, the permission conditions are limited by change of the power supply of the vehicle from the state other than the OFF state to the OFF state, as in the above (7), under a situation in which the above (1) is satisfied.

When it is assumed that the fingerprint detection process is needed for fingerprint authentication according to the permission conditions as described above, the fingerprint sensor 11 is set to the state in which the fingerprint detection process is permitted and to a state in which the fingerprint authentication in the fingerprint authentication device 1 can be performed. The permission conditions are not limited to those described above and may be appropriately set according to a situation in which the fingerprint authentication is needed based on a manipulation specification of the vehicle, or the like. For example, the content of the above (1) to (7) may be appropriately changed or deleted, and other content may be added.

Then, the non-permission condition is a condition indicating a state of the vehicle in which it is assumed that the fingerprint detection process for fingerprint authentication is not requested. In the embodiment, for example, the non-permission conditions are as follows. That is, the non-permission condition is that at least one of the following (8) to (10) is satisfied.

(8) The speed of the vehicle is equal to or higher than a predetermined value (for example, equal to or higher than 5 km/h).

(9) The power supply of the vehicle is ON (ACC ON), the fingerprint authentication process in the fingerprint authentication unit 12 is successful, and the fingerprint sensor 11 is a genuine product.

(10) The power supply of the vehicle is ON (ACC ON), and a predetermined process alternative to the fingerprint authentication process in the fingerprint authentication unit 12 is successful.

In the embodiment, the fingerprint authentication is typically executed in order to determine whether or not the transition to the ignition ON (ready ON) state is to be permitted while the vehicle is being stopped, as described above. Further, performing the fingerprint authentication while the vehicle is traveling is suppressed for improved safety. Therefore, when the above (8) is satisfied while the vehicle is traveling, it can be assumed that the fingerprint detection process is not needed.

In the embodiment, a manipulation specification is assumed in which, when the push start switch 13 is pressed so that the push start switch 13 enters the ON state in a predetermined vehicle state, the power of the vehicle enters the ACC ON state, and transition to the ignition ON (ready ON) state via the ACC ON state is performed when the fingerprint authentication is successful. Therefore, when (9) is satisfied regardless of success or failure of the above-described (8), this case is a situation in which the transition to the ignition ON (ready ON) state is already about to be performed. Under this situation, no additional fingerprint detection process is needed. Therefore, the fingerprint detection process using the fingerprint sensor 11 is suppressed. The determination as to whether or not the fingerprint sensor 11 is a genuine product can be made, for example, by the collation unit 20 performing predetermined communication with the fingerprint sensor 11 to authenticate the fingerprint sensor 11.

In the embodiment, a manipulation specification is assumed in which, when the push start switch 13 is pressed so that the push start switch 13 enters the ON state in a predetermined vehicle state, the power of the vehicle enters the ACC ON state, and transition to the ignition ON (ready ON) state via the ACC ON state is performed when authentication through communication using a transponder embedded in the portable device 40 or the like is successful instead of the fingerprint authentication. Therefore, when (10) is satisfied regardless of success or failure of the above-described (8) and (9), this case is a situation in which the transition to the ignition ON (ready ON) state is already about to be performed. Under this situation, no additional fingerprint detection process is needed. Therefore, the fingerprint detection process using the fingerprint sensor 11 is suppressed. The process that is an alternative to the fingerprint authentication is not limited to the authentication through communication using a transponder. The non-permission condition may be set according to an alternative process provided by the vehicle.

When it is assumed that the fingerprint detection process for fingerprint authentication is not requested due to the non-permission conditions as described above, the fingerprint sensor 11 is set to the state in which the fingerprint detection process is not permitted and to a state in which the fingerprint authentication of the fingerprint authentication device 1 is not performed. The non-permission conditions are not limited to those described above and may be appropriately set according to a situation in which fingerprint authentication is not needed based on the manipulation specification of the vehicle or the like. For example, the content of the above (8) to (10) may be appropriately changed or deleted, and other content may be added.

Example of Process

Figure 3:
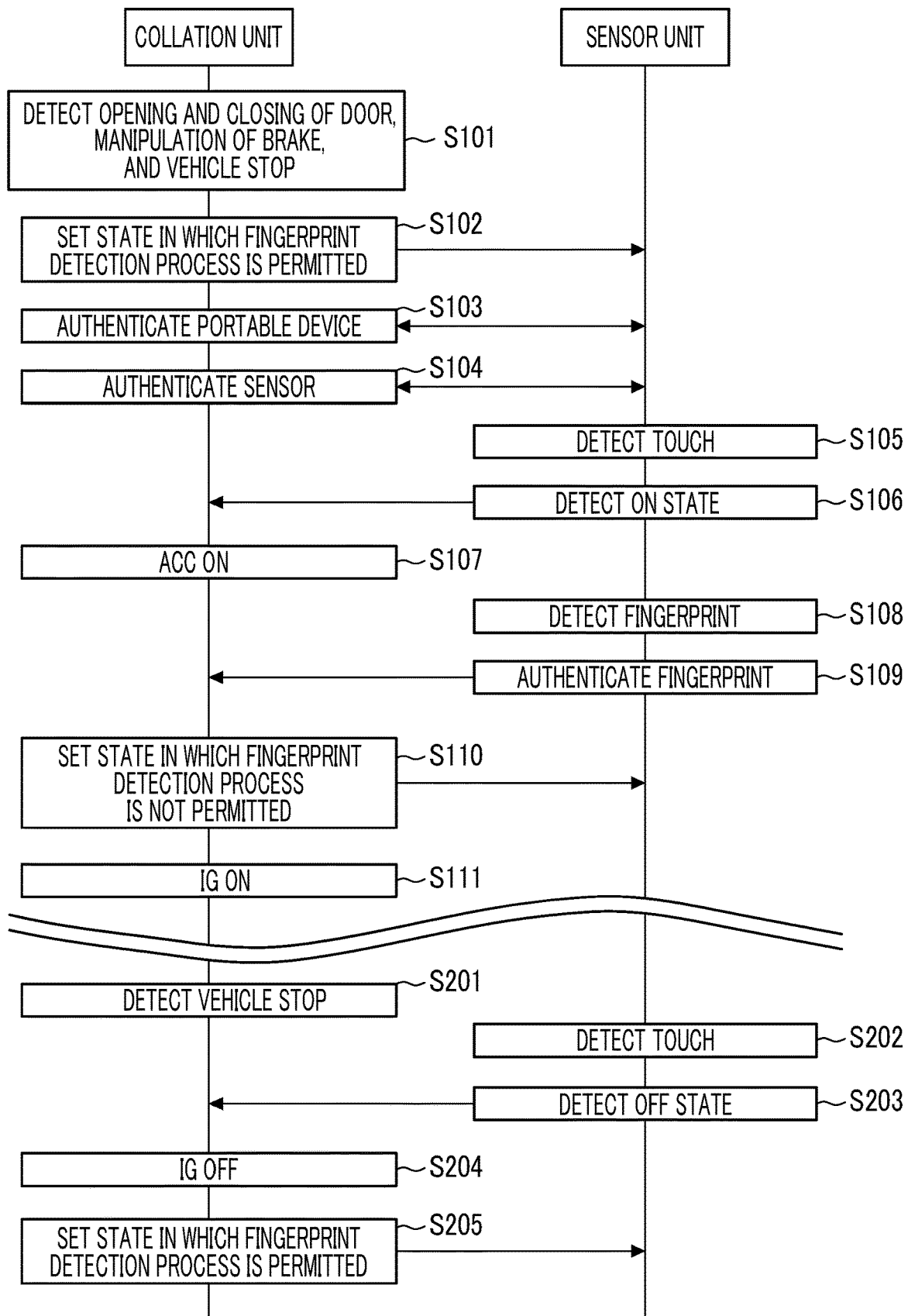
FIG. 3 is a diagram illustrating an example of a processing sequence of the fingerprint authentication device according to the embodiment of the present disclosure.

FIG. 3 is a diagram illustrating an example of a processing sequence of the collation unit 20 and the sensor unit 10. An example of a process will be described with reference to FIG. 3.

A sequence of steps S101 to S111 among the steps illustrated in FIG. 3 is a sequence that is executed from when the user gets on the vehicle until the user causes the vehicle to travel. When step S101 starts, the vehicle is stopped and the fingerprint sensor 11 is in the state in which the fingerprint detection process is not permitted.

(Step S101): The user opens the door of the driver's seat, gets on the driver's seat, and depresses the brake pedal. The collation unit 20 acquires an open and closed state of the door of the vehicle from the other vehicle-mounted device 30, and detects that the door of the driver's seat of the vehicle is changed from the closed state to the open state or that the door is changed from the open state to the closed state. Further, the collation unit 20 acquires a manipulation state of the brake pedal from the other vehicle-mounted device 30, and detects that the brake pedal is depressed and the brake is in operation. Further, the collation unit 20 acquires the speed of the vehicle from the other vehicle-mounted device 30 and detects that the vehicle is stopped. Accordingly, the content of the above (1), (2) and [(3) or (4)] constituting the permission condition is satisfied. When a user carrying the portable device 40 approaches the vehicle and manipulates a door handle before the execution of step S101, the collation unit 20 may authenticate the portable device 40 through wireless communication outside the vehicle, and permit a door opening and closing operation based on the fact that the authentication is successful.

(Step S102): Since the permission condition is satisfied in step S101, the collation unit 20 notifies the sensor unit 10 that the fingerprint sensor 11 is set to the state in which the fingerprint detection process is permitted. The sensor unit 10 receives the notification and sets the fingerprint sensor 11 to a state in which the fingerprint sensor 11 executes the fingerprint detection process when the finger is brought into contact with the fingerprint sensor 11.

(Step S103): The collation unit 20 authenticates the portable device 40 brought into the vehicle by the user through wireless communication in the vehicle. When the authentication is successful, the collation unit 20 specifies a user holding the portable device 40 as a user registered in association with the authenticated portable device 40 in advance. The collation unit 20 stores an association between the user and an identifier of the fingerprint registered in the sensor unit 10, and notifies the sensor unit 10 of the identifier corresponding to a fingerprint of the specified user.

(Step S104): The collation unit 20 communicates with the sensor unit 10 to authenticate the fingerprint sensor 11, and confirms that the fingerprint sensor 11 is a genuine product that is not a replaced unauthorized product when the authentication is successful.

(Step S105): When the user touches the fingerprint reading portion of the fingerprint sensor 11 of the push start switch 13, the sensor unit 10 detects the touch.

(Step S106): When the user subsequently presses the push start switch 13 to change the push start switch 13 from the OFF state to the ON state, the sensor unit 10 notifies the collation unit 20 that the push start switch 13 has been changed into the ON state.

(Step S107): The collation unit 20 decides that the state of the vehicle is to be set to a power supply ON (ACC ON) state. Further, the collation unit 20 appropriately sends a notification needed to actually set the above state to the other vehicle-mounted device 30.

(Step S108): When the user continues to touch the fingerprint reading portion of the fingerprint sensor 11 of the push start switch 13, the fingerprint sensor 11 captures a fingerprint to perform a fingerprint detection process.

(Step S109): When the fingerprint authentication unit 12 determines that the authentication of the user is successful when a degree of matching between the fingerprint detected in step S108 and the fingerprint corresponding to the identifier notified in step S103 among fingerprints stored in advance is equal to or higher than a predetermined degree, and notify the collation unit 20 of the result.

(Step S110): Since content of (9) described above is satisfied as a result of steps S104, S107, and S109, the non-permission condition is satisfied. Therefore, the collation unit 20 notifies the sensor unit 10 that the fingerprint sensor 11 is set to the state in which the fingerprint detection process is not permitted. The sensor unit 10 receives the notification and sets the fingerprint sensor 11 to a state in which the fingerprint sensor 11 does not execute the fingerprint detection process even when the finger is brought into contact with the fingerprint sensor 11.

(Step S111): The collation unit 20 confirms that the conditions for setting the state of the vehicle to the ignition ON (ready ON) state are all satisfied, and decides that the state of the vehicle is to be set to the ignition ON (ready ON) state. Conditions for transition to the ignition ON (ready ON) state are, for example, that a parking brake is operated, the shift position is set to the parking, the push start switch 13 is pressed so that the push start switch 13 enters the ON state in a state in which the brake pedal is depressed, and the fingerprint authentication is successful, as described above. Further, the collation unit 20 appropriately sends a notification needed to actually set the state to the other vehicle-mounted device 30. Accordingly, the vehicle enters a state in which the vehicle can travel.

Through the above process, the fingerprint sensor 11 does not execute the fingerprint detection process even when the user carelessly touches the fingerprint reading portion of the fingerprint sensor 11 provided in the push start switch 13 while the vehicle is traveling. Therefore, radio wave noise is not generated, and it is possible to suppress a possibility of degradation of in-vehicle comfort such as degradation of sound quality of a radio.

A sequence of steps S201 to S205 among the steps illustrated in FIG. 3 is a sequence that is executed from a traveling state of the vehicle to vehicle stop and power OFF. When step S201 starts, the vehicle is traveling and the fingerprint sensor 11 is in the state in which the fingerprint detection process is not permitted.

(Step S201): The user depresses the brake pedal to stop the vehicle. The collation unit 20 acquires the speed of the vehicle and detects that the vehicle is stopped.

(Step S202): When the user touches the push start switch 13, the sensor unit 10 detects the touch.

(Step S203): When the user continues to press the push start switch 13 to change the push start switch 13 from the ON state to the OFF state, the sensor unit 10 notifies the collation unit 20 that the push start switch 13 has been changed into the OFF state. Since the fingerprint sensor 11 is in the state in which the fingerprint detection process is not permitted, since the fingerprint sensor 11 does not perform the fingerprint detection process.

(Step S204): The collation unit 20 decides that the state of the vehicle is to be set to a power supply OFF state. Further, the collation unit 20 appropriately sends a notification needed to actually set the state to the other vehicle-mounted device 30.

(Step S205): it is detected that the content of the above (1) constituting the permission condition is satisfied in step S201 and the content of the above (7) constituting the permission condition is satisfied in step S204. Since the permission condition is satisfied, the collation unit 20 notifies the sensor unit 10 that the fingerprint sensor 11 is set to the state in which the fingerprint detection process is permitted. The sensor unit 10 receives the notification and sets the fingerprint sensor 11 to a state in which the fingerprint sensor 11 executes the fingerprint detection process when the finger is brought into contact with the fingerprint sensor 11. After the execution of step S205, the vehicle enters the same state as that after the execution of step S102 described above, and can execute a sequence for transition to the ignition ON (ready ON) state again.

At any timing in the above sequence, the collation unit 20 may set the fingerprint sensor 11 to the state in which the fingerprint detection process is not permitted regardless of whether or not the above-described permission condition or non-permission condition is satisfied, when it can be estimated that the user carrying the portable device 40 gets off and is away by a predetermined distance or more from the vehicle, based on a received state of the radio wave from the portable device 40. When various authentications fail, the state in which the fingerprint detection process is not permitted may be set regardless of whether or not the permission condition or the non-permission condition is satisfied.

Further, the collation unit 20 may have user authentication using fingerprint authentication as a custom function and may set validation or invalidation according to designation of the user. In this case, the above-described permission condition may be limited to a validation setting as an indispensable condition, and an invalidation setting may be added as an additional alternative condition to the above-described non-permission condition. That is, when the invalidation setting is made in the state in which the fingerprint detection process is not permitted, the state in which the fingerprint detection process is not permitted may be necessarily maintained, and when change of the validation setting to the invalidation setting is made in the state in which the fingerprint detection process is permitted, transition to the state in which the fingerprint detection process is not permitted may be necessarily performed. Accordingly, when the invalidation setting is made, the fingerprint detection process is not performed at all. Therefore, it is possible to suppress a possibility of deterioration of the in-vehicle comfort due to radio wave noise more reliably.

Further, the collation unit 20 may acquire the number of fingerprints registered in the fingerprint authentication unit 12 in the state in which the fingerprint detection process is not permitted, and maintain the state in which the fingerprint detection process is not permitted regardless of the above-described permission condition when the number of fingerprints is zero. Accordingly, when the fingerprint authentication is not possible and there is no point in performing the fingerprint detection process, the fingerprint detection process is not performed at all. Therefore, it is possible to suppress a possibility of deterioration of the in-vehicle comfort due to radio wave noise more reliably.

EFFECTS

According to the embodiment, the fingerprint detection process in the fingerprint sensor 11 is suppressed under a predetermined situation in which it is assumed that the fingerprint detection process for fingerprint authentication is not requested. Accordingly, even when the user carelessly touches the fingerprint reading portion of the fingerprint sensor 11, the fingerprint sensor 11 does not execute the fingerprint detection process. Therefore, it is possible to suppress a possibility of degradation of in-vehicle comfort such as degradation of sound quality of a radio without generation of radio wave noise. Further, since the fingerprint sensor 11 executes fingerprint detection process when the user touches the fingerprint reading portion of the fingerprint sensor 11 under a predetermined situation in which it is assumed that the fingerprint detection process for fingerprint authentication is requested, it is possible to desirably perform the fingerprint authentication.

Although the embodiment of the present disclosure have been described above, the present disclosure can be regarded as a fingerprint authentication device, a fingerprint authentication method that is executed by a computer of the fingerprint authentication device, a fingerprint authentication program, a computer-readable non-transitory recording medium storing the fingerprint authentication program, a fingerprint authentication system, a vehicle, or the like.

The present disclosure is useful for a fingerprint authentication device mounted in a vehicle or the like.

What is claimed is:

1. A fingerprint authentication device mounted in a vehicle, the fingerprint authentication device comprising:
   a sensor configured to acquire fingerprint information regarding a fingerprint;
   a processor configured to perform an authentication process based on the acquired fingerprint information; and
   a controller configured to not permit execution of the authentication process when the vehicle is not stationary.

2. The fingerprint authentication device according to claim 1, wherein the controller is further configured to permit the execution of the authentication process when the vehicle is stationary and a second condition is satisfied.

3. The fingerprint authentication device according to claim 2, wherein the second condition is that a brake of the vehicle is being depressed.

4. The fingerprint authentication device according to claim 2, wherein the second condition is that a door of a driver's side of the vehicle has changed from a closed state to an open state.

5. The fingerprint authentication device according to claim 2, wherein the second condition is that a door of a driver's side of the vehicle has changed from an open state to a closed state.

6. The fingerprint authentication device according to claim 2, wherein the second condition is that a push start switch of the vehicle has changed from an OFF state to an ON state.

7. The fingerprint authentication device according to claim 2, wherein the second condition is that a power supply of the vehicle has changed from a state other than an OFF state to the OFF state.

8. The fingerprint authentication device according to claim 1, wherein the sensor is provided on an ON/OFF button of the vehicle.

9. The fingerprint authentication device according to claim 1, wherein the controller does not permit the execution of the authentication process by inhibiting supply of power to the sensor.

10. A fingerprint authentication device mounted in a vehicle, the fingerprint authentication device comprising:
    a controller configured to:
        acquire a current speed of the vehicle,
        perform a fingerprint authentication process for a fingerprint authentication of a fingerprint when the current speed of the vehicle is equal to or lower than a predetermined value and the fingerprint authentication process is requested; and
        not perform the fingerprint authentication process when the current speed of the vehicle is higher than the predetermined value even when the fingerprint authentication process is requested.

11. The fingerprint authentication device according to claim 10, wherein the predetermined value is zero.

12. The fingerprint authentication device according to claim 10, further comprising:
    a sensor configured to acquire the fingerprint for authentication in the fingerprint authentication process.

13. The fingerprint authentication device according to claim 12, wherein the sensor is provided on an ON/OFF button of the vehicle.

14. The fingerprint authentication device according to claim 10, wherein the controller determines that the fingerprint authentication process is requested when information of the fingerprint is received by the controller and a second condition is satisfied.

15. An information processing apparatus comprising:
    a sensor configured to acquire biological information necessary for biometrics authentication, the biometrics authentication being used to determine whether predetermined control of a vehicle is executable; and
    a controller configured to suppress, based on a traveling state of the vehicle, a process regarding the biometrics authentication.

16. The information processing apparatus according to claim 15, wherein the sensor is a fingerprint sensor, the biological information is a fingerprint and the biometrics authentication is fingerprint authentication.

17. The information processing apparatus according to claim 15, wherein the controller suppresses the process regarding the biometrics authentication by inhibiting supply of power to the sensor.

18. The information processing apparatus according to claim 15, wherein the traveling state of the vehicle is a speed of the vehicle.

19. The information processing apparatus according to claim 18, wherein the controller suppresses the process regarding the biometrics authentication when the speed of the vehicle is greater than a predetermined value.

20. The information processing apparatus according to claim 19, wherein the predetermined value is zero.

* * * * *